US00RE45515E

(19) United States
(12) Reissued Patent
Wan et al.

(10) Patent Number: US RE45,515 E
(45) Date of Reissued Patent: May 12, 2015

(54) BUILT IN ON-CHIP DATA SCRAMBLER FOR NON-VOLATILE MEMORY

(71) Applicant: SanDisk Technologies Inc., Plano, TX (US)

(72) Inventors: Jun Wan, San Jose, CA (US); Yupin K Fong, Fremont, CA (US); Man L Mui, Santa Clara, CA (US)

(73) Assignee: SanDisk Technologies Inc., Plano, TX (US)

(21) Appl. No.: 14/231,126

(22) Filed: Mar. 31, 2014

Related U.S. Patent Documents

Reissue of:
(64) Patent No.: 8,145,855
Issued: Mar. 27, 2012
Appl. No.: 12/209,708
Filed: Sep. 12, 2008

(51) Int. Cl.
*G06F 13/00* (2006.01)
*G06F 12/02* (2006.01)

(52) U.S. Cl.
CPC .... *G06F 12/0246* (2013.01); *G06F 2212/1032* (2013.01)

(58) Field of Classification Search
CPC ..... G06F 12/0246; G06F 2212/1032
USPC ..... 711/103, 154; 365/185.12
See application file for complete search history.

(56) References Cited

U.S. PATENT DOCUMENTS 5,748,641 A 5/1998 Ohsawa
5,943,283 A 8/1999 Wong
6,522,580 B2 * 2/2003 Chen et al. ..... 365/185.02
6,532,556 B1 3/2003 Wong
6,826,111 B2 11/2004 Schneider
7,212,426 B2 5/2007 Park
7,424,622 B2 9/2008 Hashimoto et al.
7,885,112 B2 2/2011 Li et al.
8,060,757 B2 11/2011 Goettfert et al.
8,145,855 B2 3/2012 Wan et al.
8,429,330 B2 4/2013 Wan et al.
2008/0031042 A1 2/2008 Sharon
2008/0052444 A1 2/2008 Hwang
2008/0065812 A1 3/2008 Li
2008/0151618 A1 6/2008 Sharon (Continued)

FOREIGN PATENT DOCUMENTS

EP 1056015 A1 11/2000
EP 1684308 A1 7/2006

(Continued)

OTHER PUBLICATIONS

Non-final Office Action dated Apr. 3, 2012, U.S. Appl. No. 12/209,697, filed Sep. 12, 2008.

(Continued)

*Primary Examiner* — William H Wood
(74) *Attorney, Agent, or Firm* — Vierra Magen Marcus LLP

(57) ABSTRACT

A non-volatile memory in which data is randomized before being stored in the non-volatile memory to minimize data pattern-related read failures. Randomizing is performed using circuitry on the memory die so that the memory die is portable relative to an external, off-chip controller. Circuitry on the memory die scrambles user data based on a key which is generated using a seed which is shifted according to a write address. Corresponding on-chip descrambling is also provided.

23 Claims, 13 Drawing Sheets

(56) References Cited

U.S. PATENT DOCUMENTS

| | | | | |
|---|---|---|---|---|
| 2008/0198651 | A1 | 8/2008 | Kim | |
| 2009/0204824 | A1* | 8/2009 | Lin et al. | 713/193 |
| 2009/0225597 | A1 | 9/2009 | Shin et al. | |

FOREIGN PATENT DOCUMENTS

| | | | |
|---|---|---|---|
| WO | WO00/65602 | A1 | 11/2000 |
| WO | WO2008/031074 | A1 | 3/2008 |
| WO | WO2008/099958 | A1 | 8/2008 |

OTHER PUBLICATIONS

Response to Office Action dated Jul. 3, 2014, U.S. Appl. No. 12/209,697, filed Sep. 12, 2008.

Final Office Action dated Oct. 10, 2012, U.S. Appl. No. 12/209,697, filed Sep. 12, 2008.

Response to Office Action dated Jan. 10, 2013, U.S. Appl. No. 12/209,697, filed Sep. 12, 2008.

Notice of Allowance dated Feb. 5, 2013, U.S. Appl. No. 12/209,697, filed Sep. 12, 2008.

International Search Report and Written Opinion of the International Searching Authority dated Dec. 4, 2009 in PCT Application No. PCT/US2009/056403.

U.S. Appl. No. 11/852,229, titled "Nonvolatile memory and method for on-chip pseudo-randomization of data within a page and between pages", filed Sep. 7, 2007.

International Preliminary Report on Patentability dated Mar. 15, 2011, International Application No. PCT/US2009/056403 filed Sep. 9, 2009.

* cited by examiner

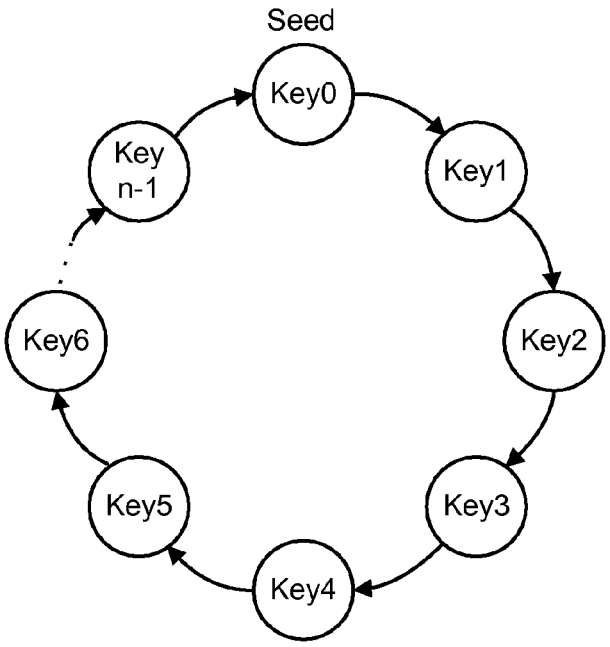
Fig. 9a
Fig. 9b
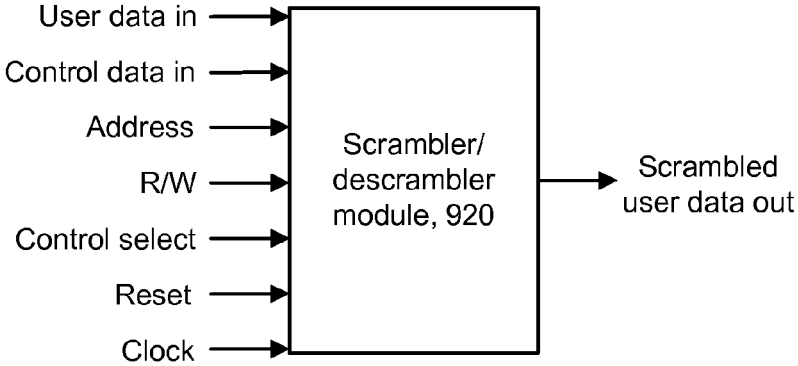
Fig. 9c
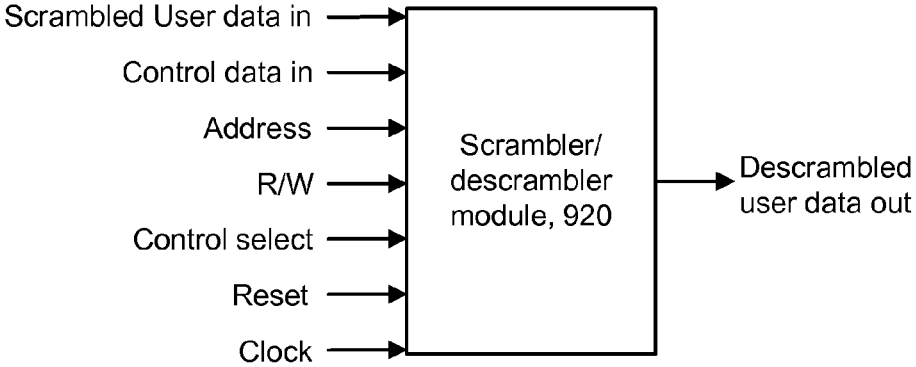

BUILT IN ON-CHIP DATA SCRAMBLER FOR NON-VOLATILE MEMORY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is related to co-pending, commonly assigned U.S. patent application Ser. No. 12/209,697, filed herewith on Sep. 12, 2008, titled "Method for Scrambling Data in Which Scrambling Data and Scrambled Data Are Stored in Corresponding Non-Volatile Memory Locations," published as US 2010/0070681 on Mar. 18, 2010, incorporated herein by reference.

BACKGROUND OF THE INVENTION

1. Field of the Invention

The present invention relates to non-volatile memory.

2. Description of the Related Art

Semiconductor memory has become increasingly popular for use in various electronic devices. For example, non-volatile semiconductor memory is used in cellular telephones, digital cameras, personal digital assistants, mobile computing devices, non-mobile computing devices and other devices. Electrically Erasable Programmable Read Only Memory (EEPROM) and flash memory are among the most popular non-volatile semiconductor memories. With flash memory, also a type of EEPROM, the contents of the whole memory array, or of a portion of the memory, can be erased in one step, in contrast to the traditional, full-featured EEPROM.

Both the traditional EEPROM and the flash memory utilize a floating gate that is positioned above and insulated from a channel region in a semiconductor substrate. The floating gate is positioned between the source and drain regions. A control gate is provided over and insulated from the floating gate. The threshold voltage ($V_{TH}$) of the transistor thus formed is controlled by the amount of charge that is retained on the floating gate. That is, the minimum amount of voltage that must be applied to the control gate before the transistor is turned on to permit conduction between its source and drain is controlled by the level of charge on the floating gate.

Some EEPROM and flash memory devices have a floating gate that is used to store two ranges of charges and, therefore, the memory element can be programmed/erased between two states, e.g., an erased state and a programmed state. Such a flash memory device is sometimes referred to as a binary flash memory device because each memory element can store one bit of data.

A multi-state (also called multi-level) flash memory device is implemented by identifying multiple distinct allowed/valid programmed threshold voltage ranges. Each distinct threshold voltage range corresponds to a predetermined value for the set of data bits encoded in the memory device. For example, each memory element can store two bits of data when the element can be placed in one of four discrete charge bands corresponding to four distinct threshold voltage ranges.

Typically, a program voltage $V_{PGM}$ applied to the control gate during a program operation is applied as a series of pulses that increase in magnitude over time. In one possible approach, the magnitude of the pulses is increased with each successive pulse by a predetermined step size, e.g., 0.2-0.4 V. $V_{PGM}$ can be applied to the control gates of flash memory elements. In the periods between the program pulses, verify operations are carried out. That is, the programming level of each element of a group of elements being programmed in parallel is read between successive programming pulses to determine whether it is equal to or greater than a verify level to which the element is being programmed. For arrays of multi-state flash memory elements, a verification step may be performed for each state of an element to determine whether the element has reached its data-associated verify level. For example, a multi-state memory element capable of storing data in four states may need to perform verify operations for three compare points.

Moreover, when programming an EEPROM or flash memory device, such as a NAND flash memory device in a NAND string, typically $V_{PGM}$ is applied to the control gate and the bit line is grounded, causing electrons from the channel of a cell or memory element, e.g., storage element, to be injected into the floating gate. When electrons accumulate in the floating gate, the floating gate becomes negatively charged and the threshold voltage of the memory element is raised so that the memory element is considered to be in a programmed state.

However, one issue which continues to be problematic is memory device reliability.

SUMMARY OF THE INVENTION

The present invention addresses the above and other issues by providing a non-volatile storage system which includes built in, on-chip scrambling and descrambling circuitry.

In one embodiment, a non-volatile memory device includes a memory die, a memory array of non-volatile storage elements fabricated on the memory die and circuitry fabricated on the memory die. The circuitry: (a) receives, from a controller which is not fabricated on the memory die, at least one write command and associated data, including user data, to be written to the non-volatile storage elements, (b) in response to the at least one write command, generates different keys for respective different portions of the associated data, the different keys are based on respective different addresses of respective different locations of the memory array, (c) encodes the different portions of the associated data based on the different keys to provide different portions of modified data, and (d) stores the different portions of modified data in the respective different locations of the memory array.

In another embodiment, a non-volatile memory device includes a controller which is configured to communicate with circuitry which is fabricated on a memory die which includes a memory array of non-volatile storage elements. The controller is not fabricated on the memory die. The controller provides to the circuitry at least one write command and associated data, in response to which the circuitry generates different keys for different portions of the associated data, encodes the different portions of the associated data based on the different keys to provide different portions of modified data, and stores the different portions of modified data in respective different locations of the memory array.

In another embodiment, a non-volatile memory device includes a memory die, a memory array of non-volatile storage elements fabricated on the memory die, and circuitry fabricated on the memory die. The circuitry: (a) receives, from a controller which is not fabricated on the memory die, at least one read command regarding associated data to be read from the non-volatile storage elements, (b) in response to the at least one read command, generates different keys for respective different portions of the associated data, the different keys are based on respective different addresses of respective different locations of the memory array, (c) and decodes the different portions of the associated data based on the different keys to provide different portions of decoded data.

Corresponding methods, systems and computer- or processor-readable storage devices which are encoded with instructions which, when executed, perform the methods provided herein, may be provided.

BRIEF DESCRIPTION OF THE DRAWINGS

FIG. 9a depicts a key shift process.

FIG. 9b depicts inputs and outputs of a scrambler/descrambler module during scrambling.

FIG. 9c depicts inputs and outputs of a scrambler/descrambler module during descrambling.

DETAILED DESCRIPTION

The present invention provides a non-volatile storage system which includes built in, on-chip scrambling and descrambling circuitry.

Figure 1:
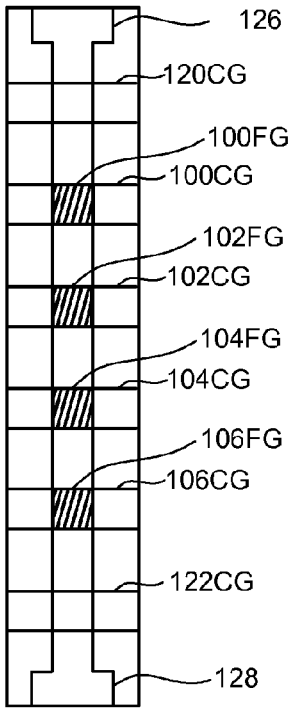
FIG. 1 is a top view of a NAND string.
Figure 2:
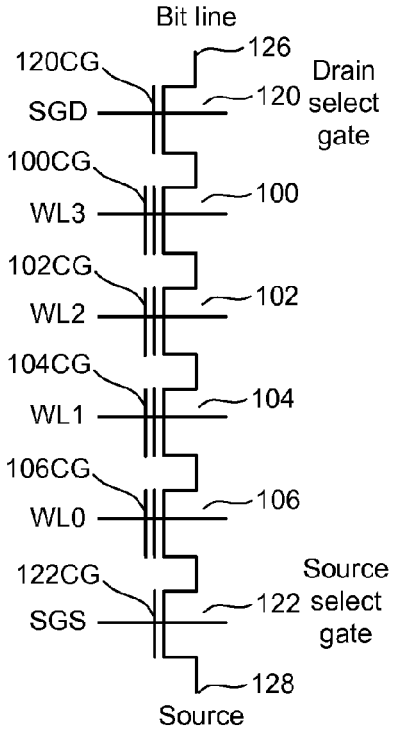
FIG. 2 is an equivalent circuit diagram of the NAND string of FIG. 1.

One example of a memory system suitable for implementing the present invention uses the NAND flash memory structure, which includes arranging multiple transistors in series between two select gates. The transistors in series and the select gates are referred to as a NAND string. FIG. 1 is a top view showing one NAND string. FIG. 2 is an equivalent circuit thereof. The NAND string depicted in FIGS. 1 and 2 includes four transistors, 100, 102, 104 and 106, in series and sandwiched between a first select gate 120 and a second select gate 122. Select gate 120 gates the NAND string connection to bit line 126. Select gate 122 gates the NAND string connection to source line 128. Select gate 120 is controlled by applying the appropriate voltages to control gate 120CG. Select gate 122 is controlled by applying the appropriate voltages to control gate 122CG. Each of the transistors 100, 102, 104 and 106 has a control gate and a floating gate. Transistor 100 has control gate 100CG and floating gate 100FG. Transistor 102 includes control gate 102CG and floating gate 102FG. Transistor 104 includes control gate 104CG and floating gate 104FG. Transistor 106 includes a control gate 106CG and floating gate 106FG. Control gate 100CG is connected to word line WL3, control gate 102CG is connected to word line WL2, control gate 104CG is connected to word line WL1, and control gate 106CG is connected to word line WL0. The control gates can also be provided as portions of the word lines. In one embodiment, transistors 100, 102, 104 and 106 are each storage elements, also referred to as memory cells. In other embodiments, the storage elements may include multiple transistors or may be different than that depicted in FIGS. 1 and 2. Select gate 120 is connected to select line SGD (drain select gate). Select gate 122 is connected to select line SGS (source select gate).

Figure 3:
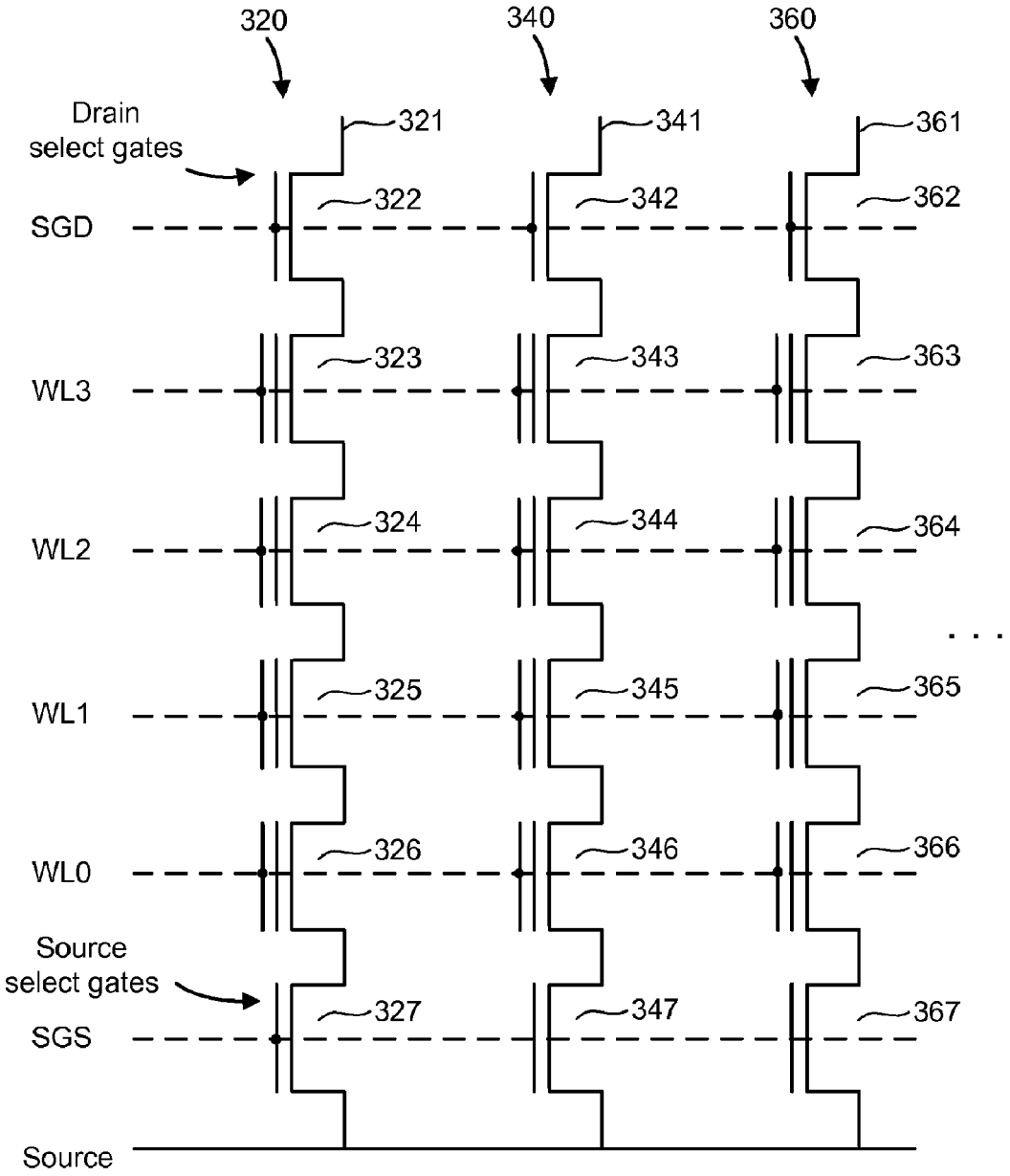
FIG. 3 is a block diagram of an array of NAND flash storage elements.

FIG. 3 is a circuit diagram depicting three NAND strings. A typical architecture for a flash memory system using a NAND structure will include several NAND strings. For example, three NAND strings 320, 340 and 360 are shown in a memory array having many more NAND strings. Each of the NAND strings includes two select gates and four storage elements. While four storage elements are illustrated for simplicity, modern NAND strings can have up to thirty-two or sixty-four storage elements, for instance.

For example, NAND string 320 includes select gates 322 and 327, and storage elements 323-326, NAND string 340 includes select gates 342 and 347, and storage elements 343-346, NAND string 360 includes select gates 362 and 367, and storage elements 363-366. Each NAND string is connected to the source line by its select gates (e.g., select gates 327, 347 or 367). A selection line SGS is used to control the source side select gates. The various NAND strings 320, 340 and 360 are connected to respective bit lines 321, 341 and 361, by select transistors in the select gates 322, 342, 362, etc. These select transistors are controlled by a drain select line SGD. In other embodiments, the select lines do not necessarily need to be in common among the NAND strings; that is, different select lines can be provided for different NAND strings. Word line WL3 is connected to the control gates for storage elements 323, 343 and 363. Word line WL2 is connected to the control gates for storage elements 324, 344 and 364. Word line WL1 is connected to the control gates for storage elements 325, 345 and 365. Word line WL0 is connected to the control gates for storage elements 326, 346 and 366. As can be seen, each bit line and the respective NAND string comprise the columns of the array or set of storage elements. The word lines (WL3, WL2, WL1 and WL0) comprise the rows of the array or set. Each word line connects the control gates of each storage element in the row. Or, the control gates may be provided by the word lines themselves. For example, word line WL2 provides the control gates for storage elements 324, 344 and 364. In practice, there can be thousands of storage elements on a word line.

Each storage element can store data. For example, when storing one bit of digital data, the range of possible threshold voltages ($V_{TH}$) of the storage element is divided into two ranges which are assigned logical data "1" and "0." In one example of a NAND type flash memory, the $V_{TH}$ is negative after the storage element is erased, and defined as logic "1." The $V_{TH}$ after a program operation is positive and defined as logic "0." When the $V_{TH}$ is negative and a read is attempted, the storage element will turn on to indicate logic "1" is being stored. When the $V_{TH}$ is positive and a read operation is attempted, the storage element will not turn on, which indicates that logic "0" is stored. A storage element can also store multiple levels of information, for example, multiple bits of digital data. In this case, the range of $V_{TH}$ value is divided into the number of levels of data. For example, if four levels of information are stored, there will be four $V_{TH}$ ranges assigned to the data values "11", "10", "01", and "00." In one example of a NAND type memory, the $V_{TH}$ after an erase operation is negative and defined as "11". Positive $V_{TH}$ values are used for the states of "10", "01", and "00." The specific relationship between the data programmed into the storage element and the threshold voltage ranges of the element depends upon the data encoding scheme adopted for the storage elements. For example, U.S. Pat. No. 6,222,762 and U.S. Pat. No. 7,237,074, both of which are incorporated herein by reference in their entirety, describe various data encoding schemes for multi-state flash storage elements.

When programming a flash storage element, a program voltage is applied to the control gate of the storage element and the bit line associated with the storage element is grounded. Electrons from the channel are injected into the floating gate. When electrons accumulate in the floating gate, the floating gate becomes negatively charged and the $V_{TH}$ of the storage element is raised. To apply the program voltage to the control gate of the storage element being programmed, that program voltage is applied on the appropriate word line. As discussed above, one storage element in each of the NAND strings share the same word line. For example, when programming storage element 324 of FIG. 3, the program voltage will also be applied to the control gates of storage elements 344 and 364.

Figure 4:
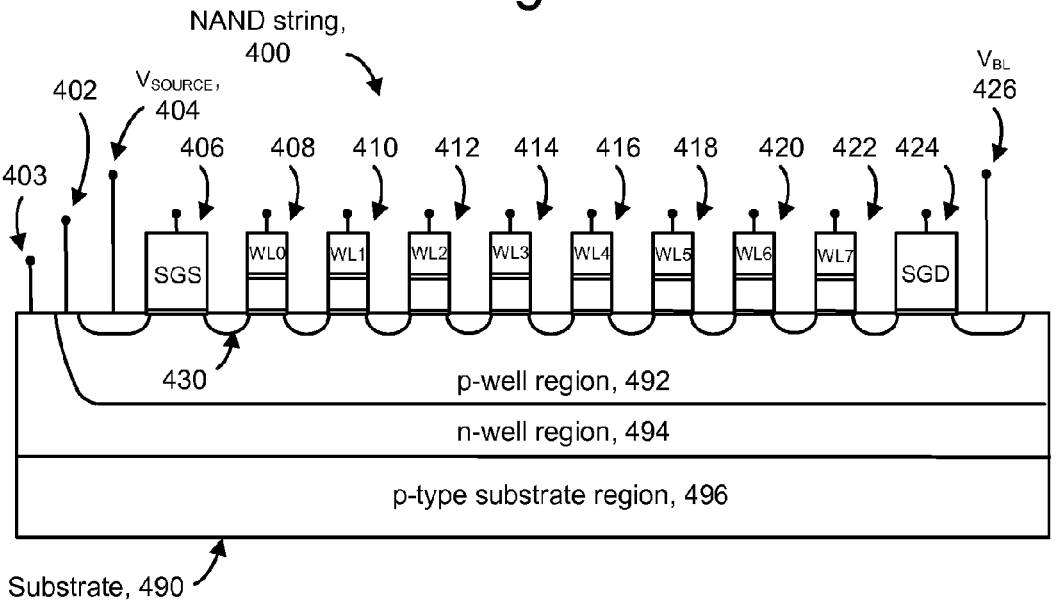
FIG. 4 depicts a cross-sectional view of a NAND string formed on a substrate.

FIG. 4 depicts a cross-sectional view of an NAND string formed on a substrate. The view is simplified and not to scale. The NAND string 400 includes a source-side select gate 406, a drain-side select gate 424, and eight storage elements 408, 410, 412, 414, 416, 418, 420 and 422, formed on a substrate 490. A number of source/drain regions, one example of which is source drain/region 430, are provided on either side of each storage element and the select gates 406 and 424. In one approach, the substrate 490 employs a triple-well technology which includes a p-well region 492 within an n-well region 494, which in turn is within a p-type substrate region 496. The NAND string and its non-volatile storage elements can be formed, at least in part, on the p-well region. A source supply line 404 with a potential of $V_{SOURCE}$ is provided in addition to a bit line 426 with a potential of $V_{BL}$. In one possible approach, a voltage can be applied to the p-well region 492 via a terminal 402. A voltage can also be applied to the n-well region 494 via a terminal 403.

During a read or verify operation, including an erase-verify operation, in which the condition of a storage element, such as its threshold voltage, is ascertained, $V_{CGR}$ is provided on a selected word line which is associated with a selected storage element. Further, recall that the control gate of a storage element may be provided as a portion of the word line. For example, WL0, WL1, WL2, WL3, WL4, WL5, WL6 and WL7 can extend via the control gates of storage elements 408, 410, 412, 414, 416, 418, 420 and 422, respectively. A read pass voltage, $V_{READ}$, can be applied to unselected word lines associated with NAND string 400, in one possible boosting scheme. Other boosting schemes apply $V_{READ}$ to some word lines and lower voltages to other word lines. $V_{SGS}$ and $V_{SGD}$ are applied to the select gates 406 and 424, respectively.

Data Scrambling

Data scrambling for non-volatile memory such as NAND memories has become increasingly important in addressing system reliability issues that are inherently susceptible by design to worst-case data patterns which trigger memory program failures. The data patterns which induce memory failures are referred to as worst-case patterns. Such failures are catastrophic due to uncorrectable error correction code (ECC) decoding as a result of program disturb. Moreover, program disturb issues depend on memory bit-line cell states in adjacent word lines and in series of word lines. Worst-case patterns include fixed repetitive data such as may be found in control data and file access table (FAT) areas. FAT data relates to file system data, and how file names, folders and the like are organized. Worst-case patterns may caused by other factors as well. For example, a world line with more low state storage elements may be disturbed by a word line with more high state cells. Data scrambling randomizes the distribution of data states in the storage elements so that worst-case data patterns are avoided. Data scrambling and descrambling should be transparent to the user.

Figure 5A:
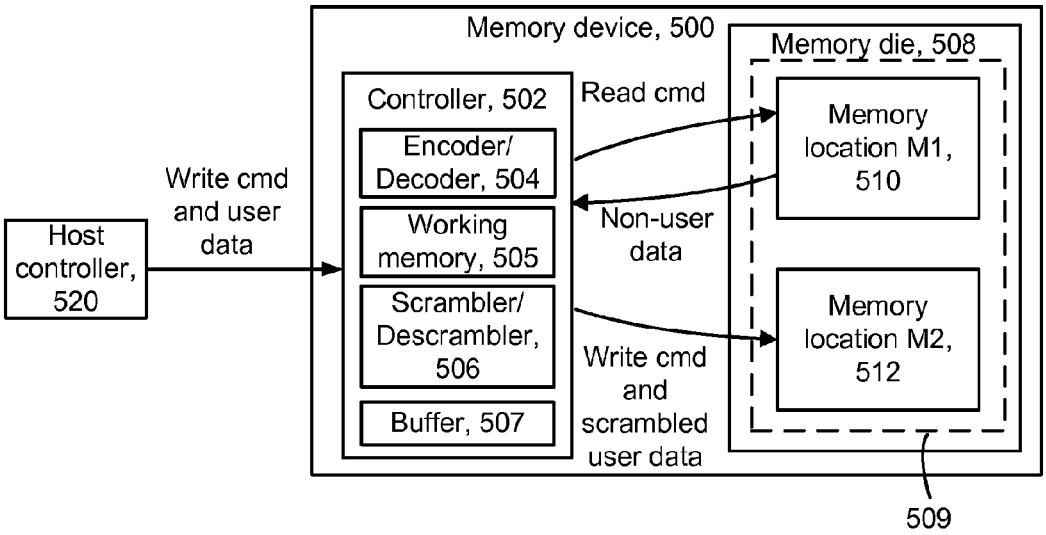
FIG. 5a depicts scrambling performed by a controller in a storage system in which non-user data and user data are stored in corresponding portions of different memory locations.

FIG. 5a depicts scrambling performed by a controller in a storage system in which non-user data and user data are stored in corresponding portions of different memory locations. One approach involves performing scrambling and descrambling of data at an off-chip controller circuit, where non-user data is stored on-chip, and user data which is encoded using the non-user data is also stored on-chip. A chip refers to a memory die on which a memory array is formed. The non-user data can be a predetermined random or pseudo random pattern of data which is used for scrambling the user data, or can be any pattern such as a test pattern. For example, a pure pattern of all zeroes or all ones could be used. The pattern need not be random or pseudo random.

Storing non-user data in the memory array is advantageous because it allows a large amount of data to be stored, e.g., a few megabytes. Such a large amount of data can be more random compared to a fixed length key of several bits in length. Further, the non-user data can be more random because it does not have to be generated a certain way such as by key shifting. The non-user data can be generated at the time of manufacture, for instance, using any technique. The non-user data can be stored in one portion of the memory array such as a block and used by a number of other portions of the memory array, such as other blocks, to encode or scramble user data which is to be stored in the other blocks. Similarly, during a reverse decoding process, scrambled or otherwise encoded user data is descrambled or otherwise decoded using the same non-user data.

Note that scrambling is considered to be a form of encoding and descrambling is considered to be a form of decoding. The terms scrambling and descrambling and the like will be used in specific examples herein in which random or pseudorandom data is used to encode or decode user data. However, a general process of coding or decoding may be substituted in place of scrambling and descrambling, respectively.

The memory device 500 includes a memory die 508 on which a number of memory locations are formed. The memory device 500 may be formed on a removable memory card or USB flash drive, for instance, which is inserted into a host device such as a laptop computer, digital camera, personal digital assistant (PDA), digital audio player or mobile (cell) phone. Such a card may include the entire memory device. Or, the controller and memory array, with associated peripheral circuits, may be provided in separate cards. Or, the memory device 500 may be embedded as part of the host system. The host device may have its own controller 520 for interacting with the memory device 500, such as to read or write user data. For example, the host controller 520 can send commands to the memory device to write or read data. The memory device controller 502 converts such commands into command signals that can be interpreted and executed by control circuitry in the memory device. The controller 502 may also contain buffer memory 507 for temporarily storing the user data being written to or read from the memory array.

A memory array 509 having a number of blocks of storage elements may be formed on the memory die 508. Example memory locations M1 510 and M2 512 of the memory array, which may be respective blocks, are depicted. The off-chip controller 502 is part of the memory device 500, and includes an encoder/decoder 504 and a scrambler/descrambler 506. In a write process, the controller 502 receives a write command and user data from the host controller 520. The write command may specify addresses in the memory array to store the user data. When the controller 502 receives the write command (cmd) and user data, it provides a read command to the first memory location M1 510 to read non-user data. The scrambler/descrambler 506 uses the non-user data to scramble the user data, thereby providing modified user data, which is written to the second memory location M2 512. Before scrambling, the encoder/decoder 504 may encode the user data such as by performing ECC coding and adding overhead data such as ECC parity bits.

The memory location in which the non-user data is stored may be of the same type as which the user data is stored, or of a different type. For example, the non-user data can be stored, e.g., in anti-fuses, which store data permanently once written, or in erasable non-volatile storage elements.

Different portions of the user data may be scrambled or otherwise encoded by a corresponding portion of the non-user data. For example, a portion of the user data which is stored on an nth word line in memory location M2 may be scrambled or otherwise encoded by non-user data which is stored on an nth world line in memory location M1. A portion of the user data on an ith page in M2 may be scrambled or otherwise encoded by non-user data on an ith page in M1. Each word line may have one or more pages. Further, a page may be made up of sub-pages, such that a portion of the user data on a jth sub-page in M2 may be scrambled or otherwise encoded by non-user data on a jth sub-page in M1. There may be multiple sub-pages per word line, for instance. Generally, any unit of the user data may be scrambled or otherwise encoded by a corresponding unit of non-user data, where the scrambled user data and non-user data are stored in corresponding locations in their respective blocks. The scrambled user data may be stored in the same location in M2 as the corresponding non-user data is stored in M1, or the scrambled user data may be stored in a location in M2 which is based on, but not the same as, the location of the corresponding non-user data in M1, such as by using an offset, e.g., non-user data is stored on WL1 in M1, user data is stored on WL2 in M2, or non-user data is stored on page-n in M1, and user data is stored on page n+1 in M2. Various other approaches are possible.

Moreover, the same block of non-user data may be used to scramble multiple blocks of user data. This reduces the relative overhead cost of storing the non-user data. For example, assume the user data which the host requests to write to the memory array is large enough that it is stored in multiple blocks. In this case, each portion of the user data in a respective portion of each block may be scrambled using the same portion of the non-user data. For example, non-user data of WL1 of block M1 is used to scramble user data of WL1 of block M2 and user data of WL1 of additional block M3. Another option is to change the non-user data which is used to encode each block such as by shifting the non-user data, e.g., scramble user data of WL1 in memory location M2 using non-user data of WL1 in memory location M1, scramble user data of WL2 in memory location M3 using non-user data of WL1 in memory location M1, etc. Or, scramble user data of WL1 in memory location M2 using non-user data of WL1 in memory location M1, scramble user data of WL21 in memory location M3 using non-user data of WL2 in memory location M1, etc. Generally, it is sufficient to provide random or pseudo random scrambling within a block, as data pattern failures as most affected by intra-block data patterns. However, providing randomization across blocks can also be desirable.

During a write process, the controller 502 responds to a write command from the host controller 520 by encoding, scrambling and writing user data to the memory array. In one possible approach, the controller 500 stores the user data in the buffer 507, processes and writes the user data to the memory array 509, and informs the host controller 520 that additional data can be received, at which time the controller stores the additional user data in the buffer 507, processes and writes the additional user data to the memory array 509, and so forth. The controller 502 may write portions of the user data which are smaller than what is requested to be written in the write command from the host controller 520, or the controller 502 may write portions of the non-user data which are same as what is requested to be written by the host controller 520. For example, the controller 502 may receive one page of data to be written. In response, the controller 502 reads one page of non-user data from the memory location M1, stores it in its working memory 505 with the user data, scrambles the user data to provide modified user data which is also stored in its working memory 505, and writes the page of modified user data to the memory location M2. In another approach, the controller 502 processes the user data in smaller units than one page so that multiple iterations of reading non-user data, scrambling the user data and writing the scrambled user data are performed. In another approach, the controller 502 reads one page of non-user data, but performs multiple iterations of scrambling the user data and writing the scrambled user data.

Typically, the controller 502 informs the host controller 520 when it can receive additional user data to be written. The host controller 520 can respond by sending another write command with associated user data to the memory device. For example the data may be written page by page.

Figure 6A:
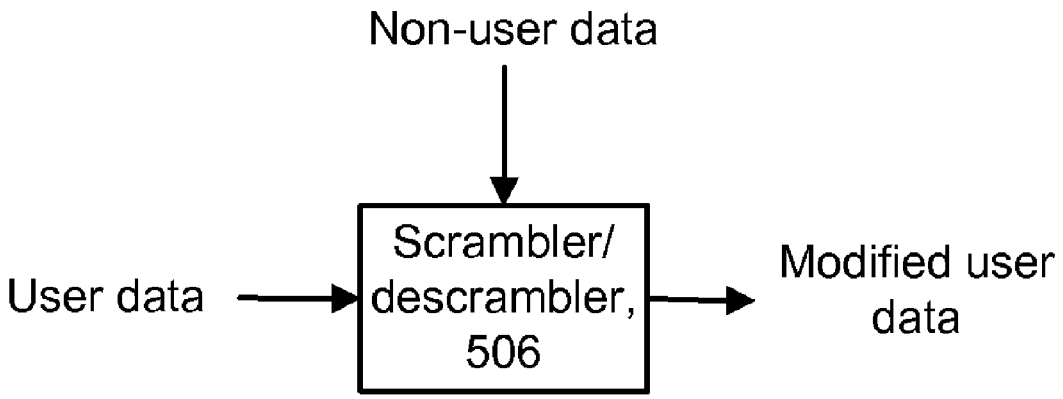
FIG. 6a depicts scrambling of user data based on non-user data.

The scrambling process of the scrambler/descrambler 506 may involve performing one or more logical operations, e.g., AND, XOR and/or NOR operations which involve the user data and the non-user data, such as depicted in FIG. 6a. FIG. 6a depicts scrambling of user data based on non-user data to provide modified user data which is written to the memory array. The controller 502 may read successive portions of the non-user data to scramble corresponding successive portions of the user data, one portion at a time, in one approach. The controller may have a processor, working memory 505 and other components as needed to carry out the desired functions. In one approach, the controller 502 loads user data and non-user data to respective latches, performs a logical operation involving the user data and non-user data, and stores a result of the operation in another latch as the scrambled user data which is written to the memory array 509.

Figure 5B:
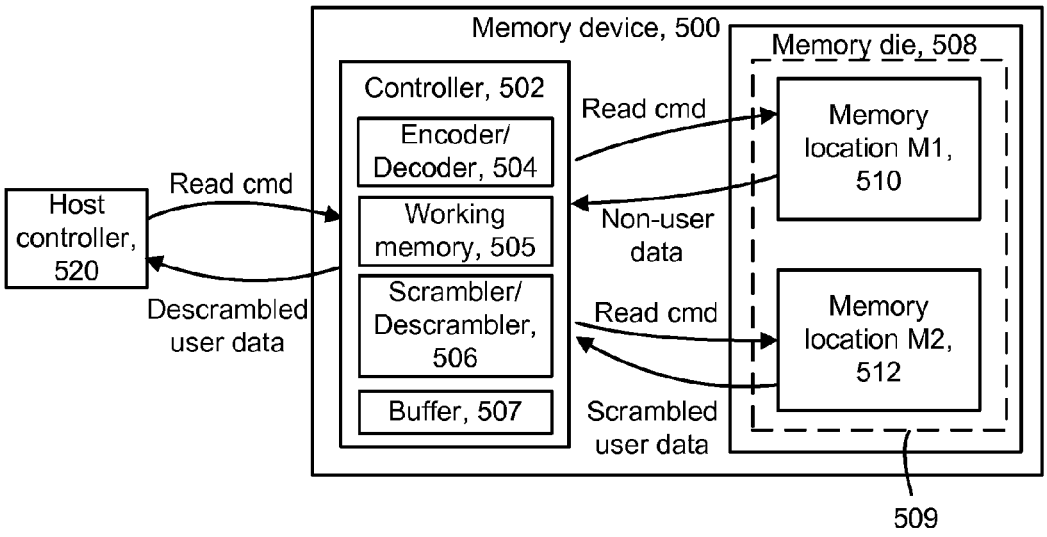
FIG. 5b depicts descrambling performed by a controller in a storage system in which non-user data and user data are stored in corresponding portions of different memory locations.

FIG. 5b depicts descrambling performed by a controller in a storage system in which non-user data and user data are stored in corresponding portions of different memory locations. In a reverse process to that of FIG. 5a, scrambled data is read from the memory array 509. For example, the host controller 520 may provide a read command to the controller 502 which specifies an address of user data to be read. In response to the read command, the controller 502 reads the corresponding user data, from memory location M2 in a scrambled form, for instance. The controller 502 also reads non-user data which corresponds to the user data, from memory location M1, and descrambles the user data. Decoding may also be performed, such as ECC decoding, to obtain the user data in a form which is made accessible to the host controller 520. Specifically, the controller 502 may store the decoded user data in the buffer 507 and inform the host controller 520 that the data is available to be read in a format which is acceptable to the host controller. After reading the data, the host controller 520 may issue a further read command to the controller 502.

By analogy to the write process discussed previously, portions of the scrambled or otherwise modified user data are read from respective locations in the memory array and descrambled using non-user data which is read from corresponding respective locations in the memory array. For example, a portion of the user data on an ith page in M2 may be descrambled or otherwise decoded by non-user data on an ith page in M1. Each word line may have one or more pages. Further, a page may be made up of sub-pages, such that a portion of the user data on a jth sub-page in M2 may be descrambled or otherwise decoded by non-user data on a jth sub-page in M1.

Moreover, the controller 502 may read portions of the user data which are smaller than what is requested to be read in the read command from the host controller 520, or the controller 502 may read portions of the non-user data which are same as what is requested to be read by the host controller 520.

Figure 6B:
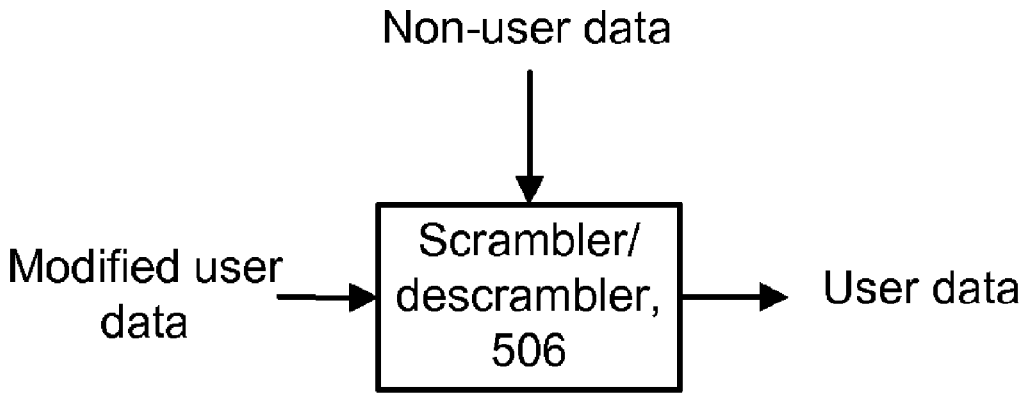
FIG. 6b depicts descrambling of user data based on non-user data.

The descrambling process may involve performing one or more logical operations, e.g., AND, XOR and/or NOR, involving the scrambled or other wise modified user data and the non-user data, such as depicted in FIG. 6b, to provide descrambled user data. FIG. 6b depicts descrambling of user data based on non-user data. The controller may read successive portions of the non-user data to descramble corresponding successive portions of the user data, one portion at a time, in one approach. The controller may have a processor, working memory 505 and other components as needed to carry out the desired functions. In one approach, the controller 502 loads user data and non-user data to respective latches, performs a logical operation involving the user data and non-user data, and stores a result of the operation in another latch as the descrambled user data which is made available in the buffer 507 for the host controller 520. The descrambled user data may be subject to additional decoding such as ECC decoding, as mentioned.

An alternative to the storage systems of FIGS. 5a and 5b is to provide the non-user data of memory location M1 in the controller 502 rather than in the memory array. In this case, the controller 502 can quickly combine the user data and the non-user data to provide the scrambled data without the need to transfer a relatively large amount of data from the memory die. This reduces overhead costs incurred by such a data transfer. However, additional memory is needed at the controller to store the non-user data. The controller 502 can use non-volatile memory such as anti-fuses in this approach.

Figure 7A:
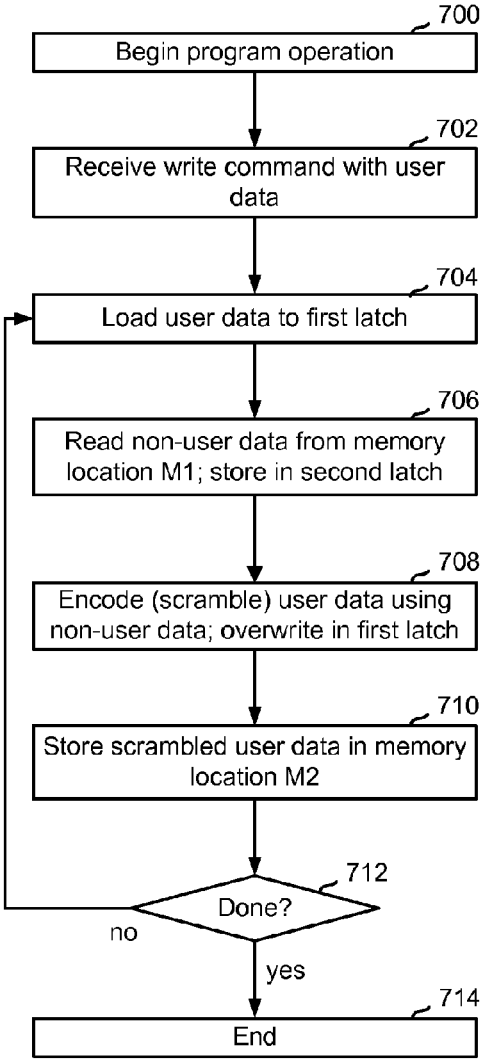
FIG. 7a depicts a scrambling process in which non-user data and user data are stored in corresponding portions of different memory locations.

FIG. 7a depicts a scrambling process in which non-user data and user data are stored in corresponding portions of different memory locations. Note that the steps depicted in this and other flowcharts are not necessarily performed as discrete steps but may overlap. A programming operation begins at step 700. At step 702 a write command and associated user data are received, such as at a controller of a memory device, from a host controller.

At step 704, the controller loads user data to its working memory such as in a first data latch. At step 706, the controller reads a corresponding amount of non-user data from the memory location M1, and stores the non-user data in a second latch. For example, the user data may represent a page of data such as 2,048 bytes, in which case the non-user data may also have 2,048 bytes, in one possible approach, so that the user data and non-user data are bit strings of equal length. Generally, the user data can be provided as any unit of data, including a sub-page, which is a portion of a page, a page, a word line or other unit of data. An example word line has 8,512 storage elements which store two pages of data, with four states per storage element.

At step 708, the controller encodes, e.g., scrambles, the user data using the non-user data and may overwrite the scrambled data into the first latch, in one possible approach. At step 710, the controller stores the scrambled user data in a memory location M2. M1 and M2 may represent first and second memory locations, such as first and second blocks, respectively, in a memory array. At decision step 712, if there is no additional user data to scramble and write, the program operation ends at step 714. At decision step 712, if there is additional user data to scramble and write, the process continues at step 704 for the next data portion. In each pass, each different portion of user data is scrambled using a corresponding different portion of the non-user data. Note that the process may be repeated from step 702 if the controller receives a further write command and user data.

Figure 7B:
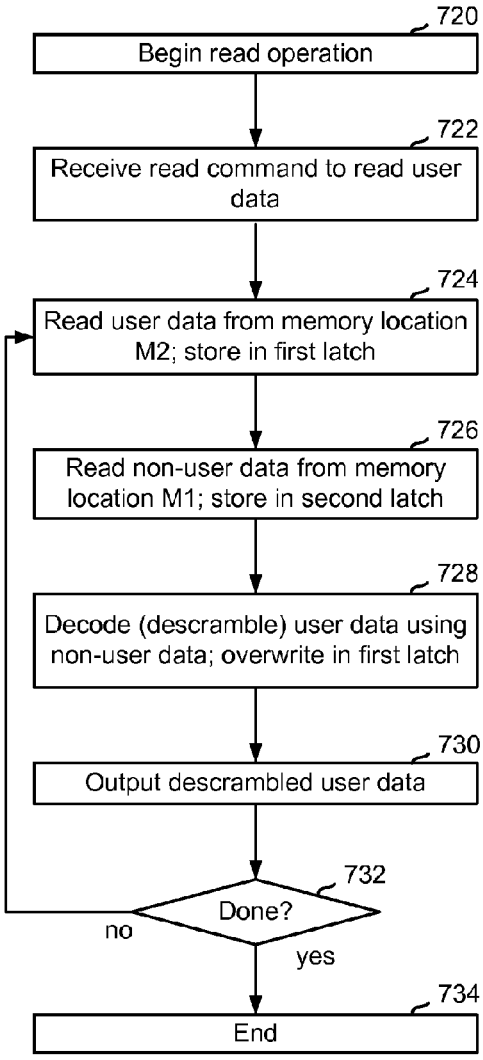
FIG. 7b depicts a descrambling process in which non-user data and user data are stored in corresponding portions of different memory locations.

FIG. 7b depicts a descrambling process in which non-user data and user data are stored in corresponding portions of different memory locations. A read operation begins at step 720. At step 722 a read command is received, such as at a controller of a memory device, from a host controller. At step 724, the controller reads the scrambled user data from memory location M2 and stores it in its working memory such as in a first data latch. At step 726, the controller reads a corresponding portion of non-user data from the memory location M1, and stores the non-user data in a second latch. At step 728, the controller decodes, e.g., descrambles, the user data using the non-user data, and may overwrite the descrambled data into the first latch, in one possible approach. At step 730, the controller outputs the descrambled user data such as by providing it in a buffer and informing the host controller that it may read the buffer. At decision step 732, if there is no additional user data to descramble, the read operation ends at step 734. Note that the process may be repeated from step 722 if the controller receives a further read command. At decision step 732, if there is additional user data to descramble, the process continues at step 724 for the next portion of user data.

Figure 8A:
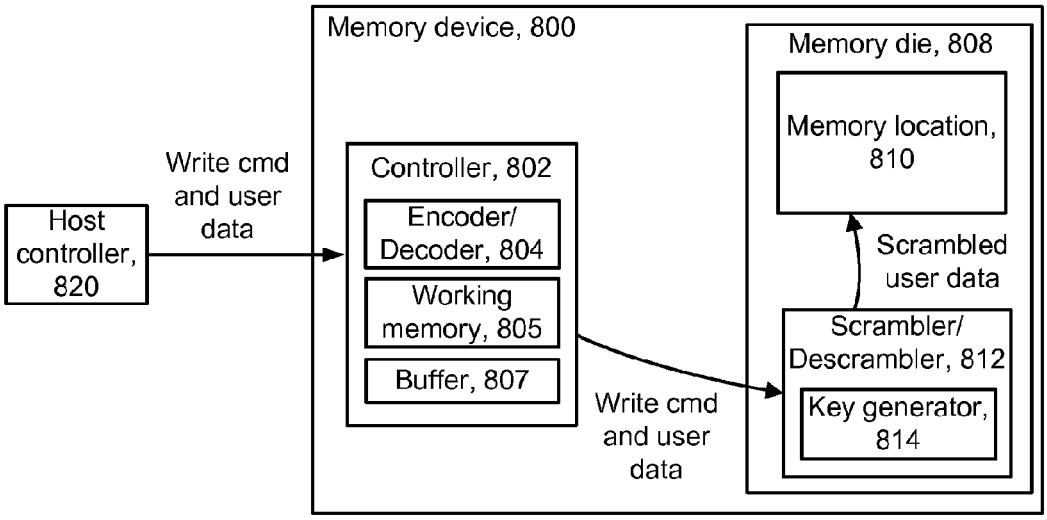
FIG. 8a depicts scrambling performed by on-chip circuitry using a key generator in a storage system.

FIG. 8a depicts scrambling performed by on-chip circuitry using a key generator in a storage system. In this approach, a scrambler/descrambler 812 is on the memory die 808 rather than in a controller 802 of the memory device 800. This approach provides portability of the memory die so that it can be used with different controllers, for instance, which are made by different manufacturers. The scrambler/descrambler 812 may be a state machine, for instance. In one possible approach, the host controller 820 provides a write command and associated user to the controller 802, which in turn communicates one or more corresponding write commands and the user data to the scrambler/descrambler 812 on the memory die 808. The controller 802 may process the user data such as by performing ECC coding and adding overhead data at an encoder/decoder 804. With this approach, the overhead data is also scrambled with the user data. This helps avoid header and ECC type data pattern failures. The scrambler/descrambler 812 may use a key generator 814 to generate different random or pseudo random keys, where each key is used to scramble a different portion of the user data. The scrambled user data is then written to a memory location 810. The controller 802 may have a working memory 805 and buffer 807. As with the approach of FIG. 5a, the user data may be scrambled and written in successive portions which are smaller than the amount of data provided by the host, or in a single unit which is the same as provided by the host.

Figure 8B:
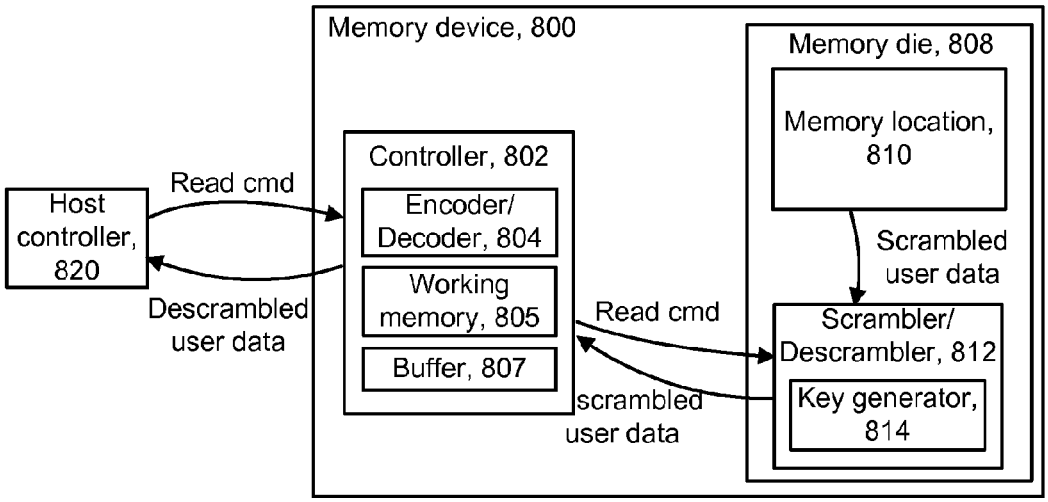
FIG. 8b depicts descrambling performed by on-chip circuitry using a key generator in a storage system.

FIG. 8b depicts descrambling performed by on-chip circuitry using a key generator in a storage system. In a process which is the reverse of that depicted in FIG. 8a, the controller receives a read command from the host controller 820. The read command may specify an address in which the requested user data was stored. The controller 802 provides one or more corresponding read commands to the scrambler/descrambler 812. The scrambler/descrambler 812 may use the key generator 814 to generate the different random or pseudo random keys which were used for scrambling, where each key is used to descramble a different portion of the user data. The descrambled user data is then provided to the controller 802 and stored in the buffer 807 for read out by the host controller 820. As with the approach of FIG. 5b, the user data may be read and descrambled in successive portions which are smaller than the amount of data request by the host, or in a single unit which is the same as requested by the host.

FIG. 9a depicts a key shift process. In one possible approach, the key generator 814 of the scrambler/descrambler 812 of FIGS. 8a and 8b may use a key shift in which a seed key, key0 is shifted in a shift register to generate successive keys which are used to scramble or descramble respective successive portions of user data. For example, key0 may be shifted to generate key1, key2, . . . , keyn−1, so that n keys total are used. When additional portions of user data are scrambled or descrambled, key0 is used next and the process repeats so that the n keys are reused if necessary. As an example, the key may be 32 bits. This approach may provide a lesser degree of randomness that the approach of FIGS. 5a and 5b, in which a relatively large amount of scrambling data may be stored due to the allocation of up to an entire block of a memory array, for instance. However, an adequate degree of randomness may be realized while performing the scrambling and descrambling within the limited available space of the memory die. Note that a key shift is not required as other key generating techniques may be used.

FIG. 9b depicts inputs and outputs of a scrambler/descrambler module during scrambling. The module 920 may be part of the scrambler/descrambler 812 of FIGS. 8a and 8b, for instance. The module receives a number of inputs and provides scrambled user data as an output. For example, the inputs may include user data in, such as in 32-bit units, which are received from the controller 802. Control data in may also be received from the controller 802, along with address data, which specifies an address in which user data is to be written in the memory location 810, a read/write (R/W) command which indicates that a write is to be performed, in this case, and a control select signal. A reset signal and clock signal are also received.

The seed key can be used to provide a sequence of bits depending on the clock. The seed key can be stored in non-volatile memory on the memory chip. When a portion of user data is provided to the module 920, the clock is synchronized. The key is the same length as the user data which is scrambled, and is continually generated based on the clock. After a while, the key repeats. Moreover, the key which is used to scramble a portion of user data can be based on an address of a memory location at which the portion of user data is to be stored. For example, the scrambling key can be determined by shifting the seed key by amount which is based on the address. As an example, the address data may indicate that the current portion of user data is to be stored at a fifth page in a block, in which case the seed key can be shifted five times to arrive at key5, which is then used to scramble the user data. A sub-page, page, word line or other write unit may be identified by the address data, for instance. Each page or other write unit in a block can have a unique address. For more than n shifts, the resulting key is identified by modulo (n) of the number of shifts. Various other approaches are possible. When the user data is subsequently read back, the same key can be generated for descrambling or other decoding.

Generally, it is desirable for each word line to be randomized as well as each set of word lines. After the scrambling operation is performed, the scrambled user data may be stored in a latch of size, e.g., 4,096 bytes, and written to the designated memory location.

FIG. 9c depicts inputs and outputs of a scrambler/descrambler module during descrambling. The same module 920 may be used for both scrambling and descrambling, in one approach. The process performed is the reverse of that of FIG. 9b. The inputs to the module include the scrambled user data in, such as in 32-bit units, which are read from the memory location 810. Control data in may also be received from the controller 802, along with address data, which specifies an address from which user data is to be read in the memory location 810, a read/write (R/W) command which indicates that a read is to be performed, in this case, and a control select signal. The reset signal and clock signal are also received.

As mentioned, the seed key is shifted based on the address to provide the descrambling key. As an example, the address data may indicate that the current portion of user data is to be read from the fifth page in a block, in which case the seed key can then be shifted five times to arrive at key5, which is then used to descramble the user data. A write unit is identified by the address data. Various other approaches are possible. The module 920 outputs the descrambled user data to the controller 802, which may perform additional decoding and make the user data available to the host controller via the buffer 807.

Figure 10A:
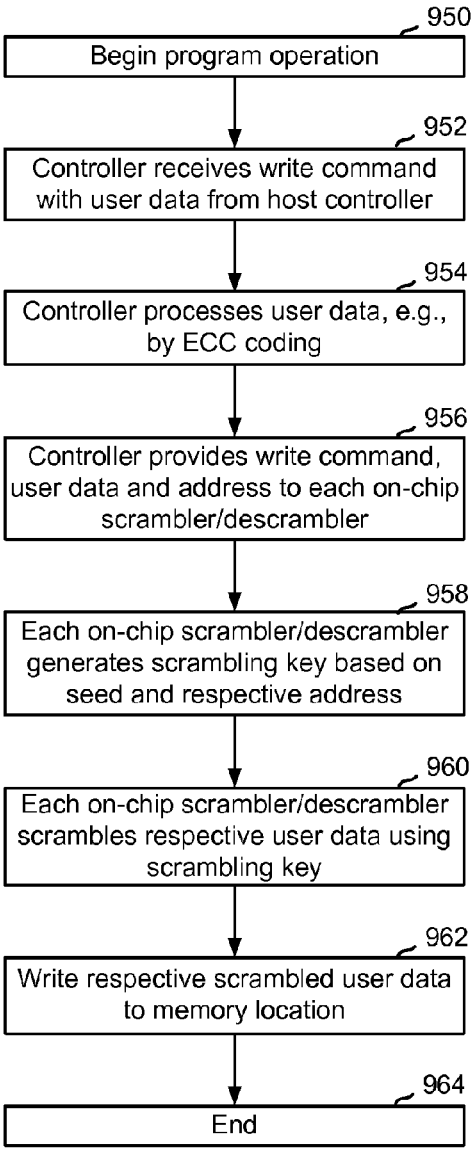
FIG. 10a depicts a scrambling process performed by on-chip circuitry using a key generator.

FIG. 10a depicts a scrambling process performed by on-chip circuitry using a key generator. The process corresponds generally to the system of FIG. 8a. In one approach described further below in connection with FIG. 13, multiple scrambler/descramblers are used to divide up the task of scrambling and descrambling and work in parallel. For example, with a 32 bit key, user data portions of 32 bits are processed by each scrambler/descrambler. However, such processing can occur generally in parallel to maintain performance. This approach can be implemented with minor changes to existing memory designs which have processing and data storage resources which are local to groups of bit lines. Thus, a page of data may be stored on a word line as a number of sub-pages, where a scrambler/descrambler is provided for each sub-page, and multiple scrambler/descramblers are used to write data to a page, or read data from page.

A programming operation begins at step 950. At step 952, the controller receives a write command with associated user data from a host controller. At step 954, the controller processes the user data, such as by performing ECC coding and adding overhead data. At step 956, the controller provides a write command, user data and an address to each on-chip scrambler/descrambler. At step 958, each on-chip scrambler/descrambler generates a scrambling key based on a seed and the address. In one approach, each scrambler/descrambler receives the same address, such as a page address, but is programmed to generate a different key by adding an additional shift to the shift which is indicated by the page address. For example, a page address may indicate a fifth page of user data in a block is to be written. In this case, key5 is used by a first scrambler/descrambler which handles a first portion, e.g., bits 0-31, of the page, key6 is used by a second scrambler/descrambler which handles a second portion of the page, e.g., bits 32-63, and so forth. At step 960, each on-chip scrambler/descrambler scrambles its respective user data using its respective scrambling key. At step 962, each respective scrambler/descrambler provides its respective user data to a bit line latch to be written to the respective memory location, such as to the storage element associated with a read/write stack. The programming ends at step 964. Note that the process may be repeated from step 952 if the controller receives a further write command and user data. The scrambler thus is an intermediary which provides additional processing of the user data before it is written to the memory location.

If one scrambler/descrambler is used to scramble all user data, the task of scrambling and need not be divided as indicated.

Figure 10B:
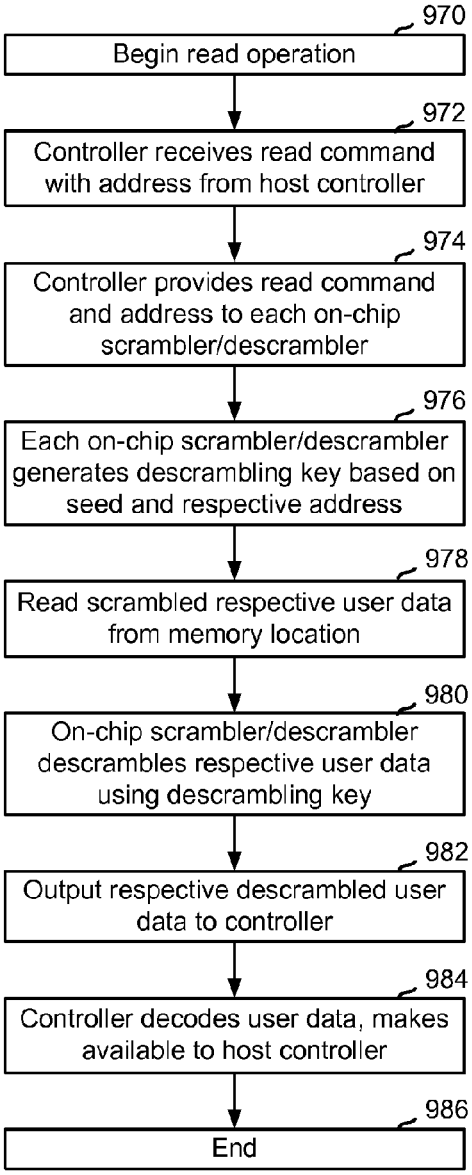
FIG. 10b depicts a descrambling process performed by on-chip circuitry using a key generator.

FIG. 10b depicts a descrambling process performed by on-chip circuitry using a key generator. The process corresponds generally to the system of FIG. 8b and provides a reverse process to that of FIG. 10a. A read operation begins at step 970. At step 972, the controller receives a read command with an address from a host controller. At step 974, the controller provides a read command and address to each on-chip scrambler/descrambler. At step 976, each on-chip scrambler/descrambler generates a scrambling key based on a seed and the address, and optionally, and additional shift, as discussed. At step 978, scrambled user data is read from the memory array, stored in a bit line latch, and accessed by each scrambler/descrambler. At step 980, each on-chip scrambler/descrambler descrambles its respective user data using its respective scrambling key. At step 982, each scrambler/descrambler outputs the descrambled user data to the controller. At step 984, the controller processes the user data such as by performing ECC decoding, and makes the resulting decoded data available to the host controller, such as by storing it in a buffer and setting a READY/BUSY flag to READY. The process ends at step 986. The descrambler thus is an intermediary which provides additional processing of the user data when it is read from the memory location.

If one scrambler/descrambler is used to descramble all user data, the task of descrambling and need not be divided as indicated.

Note also that, in any of the embodiments provided herein, not all data need be scrambled. For example, it may be desired to scramble only a part of a page of data. In such cases, a specific bit pattern such as all O's can be used when scrambling the page so that a portion of the bits of the page is unchanged.

Figure 11:
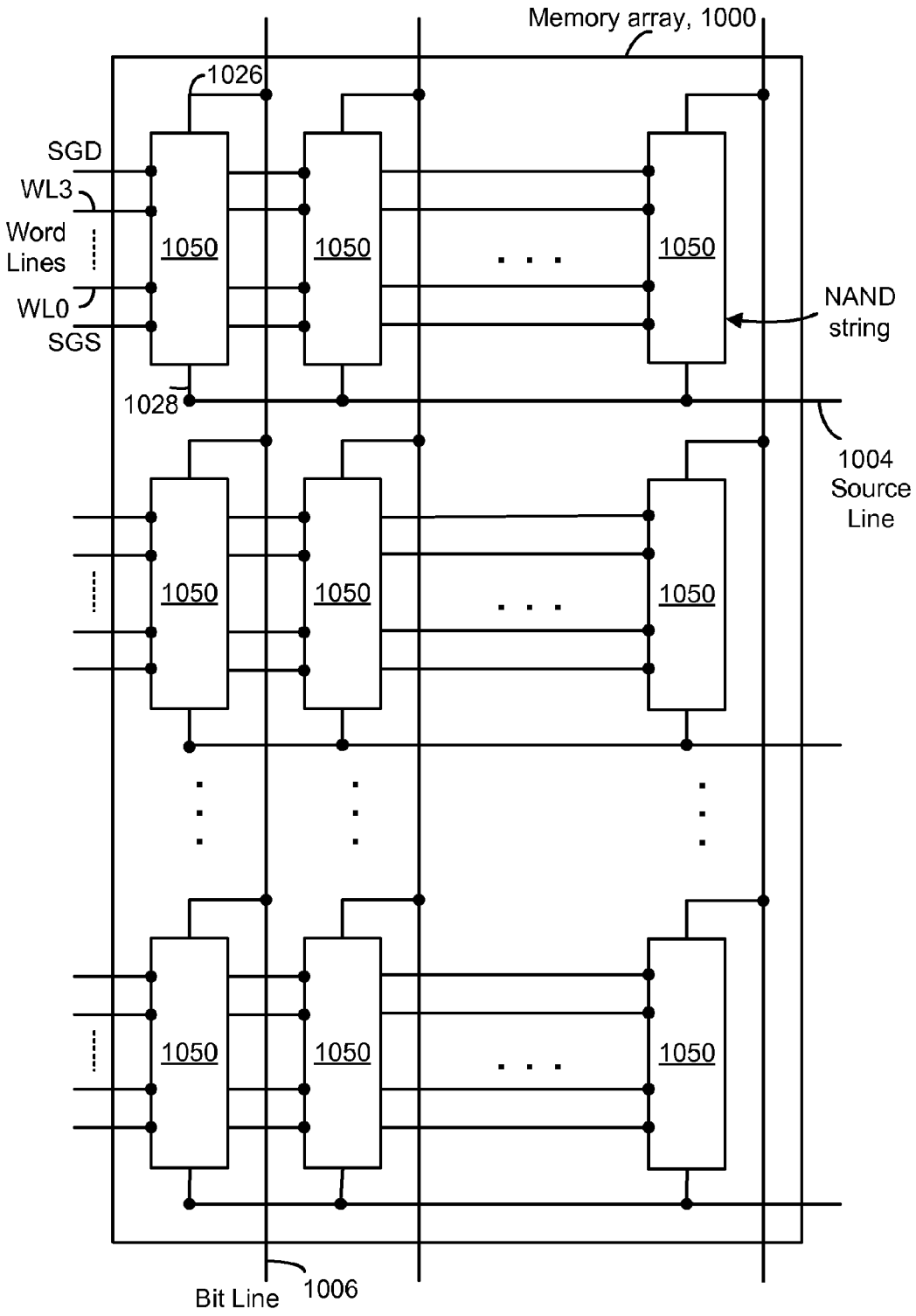
FIG. 11 depicts an example of an array of storage elements, including different sets of NAND strings.

FIG. 11 illustrates an example of an array 1000 of NAND storage elements, such as those shown in FIGS. 1 and 2. Along each column, a bit line 1006 is coupled to the drain terminal 1026 of the drain select gate for the NAND string 1050. Along each row of NAND strings, a source line 1004 may connect all the source terminals 1028 of the source select gates of the NAND strings.

The array of storage elements is divided into a large number of blocks of storage elements. As is common for flash EEPROM systems, the block is the unit of erase. That is, each block contains the minimum number of storage elements that are erased together. Each block is typically divided into a number of pages. A page is the smallest unit of programming. One or more pages of data are typically stored in one row of storage elements. For example, a row typically contains several interleaved pages or it may constitute one page. All storage elements of a page will be read or programmed together. Moreover, a page can store user data from one or more sectors. A sector is a logical concept used by the host as a convenient unit of user data; it typically does not contain overhead data, which is confined to the controller. Overhead data may include an Error Correction Code (ECC) that has been calculated from the user data of the sector. A portion of the controller (described below) calculates the ECC when data is being programmed into the array, and also checks it when data is being read from the array. Alternatively, the ECCs and/or other overhead data are stored in different pages, or even different blocks, than the user data to which they pertain.

A sector of user data is typically 512 bytes, corresponding to the size of a sector in magnetic disk drives. Overhead data is typically an additional 16-20 bytes. A large number of pages form a block, anywhere from 8 pages, for example, up to 32, 64, 128 or more pages. In some embodiments, a row of NAND strings comprises a block.

Memory storage elements are erased in one embodiment by raising the p-well to an erase voltage (e.g., 14-22 V) for a sufficient period of time and grounding the word lines of a selected block while the source and bit lines are floating. Erasing can be performed on the entire memory array, separate blocks, or another unit of storage elements.

In addition to NAND, the techniques provided herein are applicable to other non-volatile storage technologies including NOR.

Figure 12:
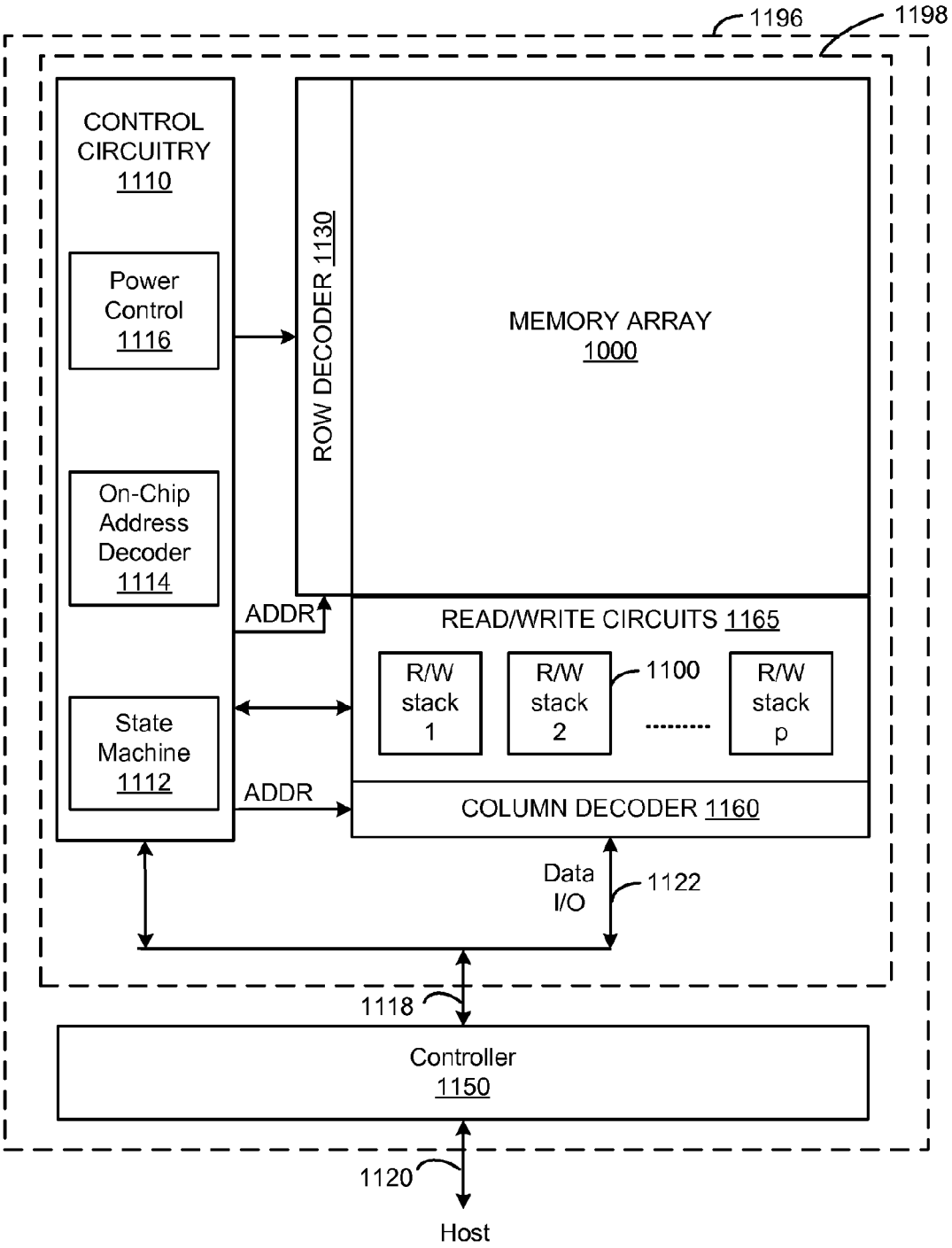
FIG. 12 is a block diagram of a non-volatile memory system using single row/column decoders and read/write circuits.

FIG. 12 is a block diagram of a non-volatile memory system using single row/column decoders and read/write circuits. The diagram illustrates a memory device 1196 having read/write circuits for reading and programming a page of storage elements in parallel, according to one embodiment of the present invention. Memory device 1196 may include one or more memory die 1198. Memory die 1198 includes a two-dimensional array of storage elements 1000, control circuitry 1110, and read/write circuits 1165. In some embodiments, the array of storage elements can be three dimensional. The memory array 1000 is addressable by word lines via a row decoder 1130 and by bit lines via a column decoder 1160. The read/write circuits 1165 include multiple read/write (R/W) stacks 1100 which allow a page of storage elements to be read or programmed in parallel. Each read/write (R/W) stack 1100 is on-chip circuitry. Typically an off-chip controller 1150 (analogous to controller 502 in FIGS. 5a and 5b, and to controller 802 in FIGS. 8a and 8b) is included in the same memory device 1196 (e.g., a removable storage card) as the one or more memory die 1198. Commands and Data are transferred between the host and controller 1150 via lines 1120 and between the controller and the one or more memory die 1198 via lines 1118.

The control circuitry 1110 cooperates with the read/write circuits 1165 to perform memory operations on the memory array 1000. The control circuitry 1110 includes a state machine 1112, an on-chip address decoder 1114 and a power control module 1116. The state machine 1112 provides chip-level control of memory operations. The on-chip address decoder 1114 provides an address interface between that used by the host or a memory controller to the hardware address used by the decoders 1130 and 1160. The power control module 1116 controls the power and voltages supplied to the word lines and bit lines during memory operations.

In some implementations, some of the components of FIG. 11 can be combined. In various designs, one or more of the components (alone or in combination), other than memory array 1000, can be thought of as a managing or control circuit. For example, one or more managing or control circuits may include any one of or a combination of control circuitry 1110, state machine 1112, decoders 1114/1160, power control 1116, R/W stacks 1100, read/write circuits 1165, controller 1150, etc.

In another approach, access to the memory array 1100 by the various peripheral circuits is implemented in a symmetric fashion, on opposite sides of the array, so that the densities of access lines and circuitry on each side are reduced by half. Thus, the row decoder is split into two row decoders and the column decoder is split into two column decoders. Similarly, the read/write circuits are split into read/write circuits connecting to bit lines from the bottom of the array 1100 and read/write circuits connecting to bit lines from the top of the array 1 100. In this way, the density of the read/write modules is essentially reduced by one half.

Figure 13:
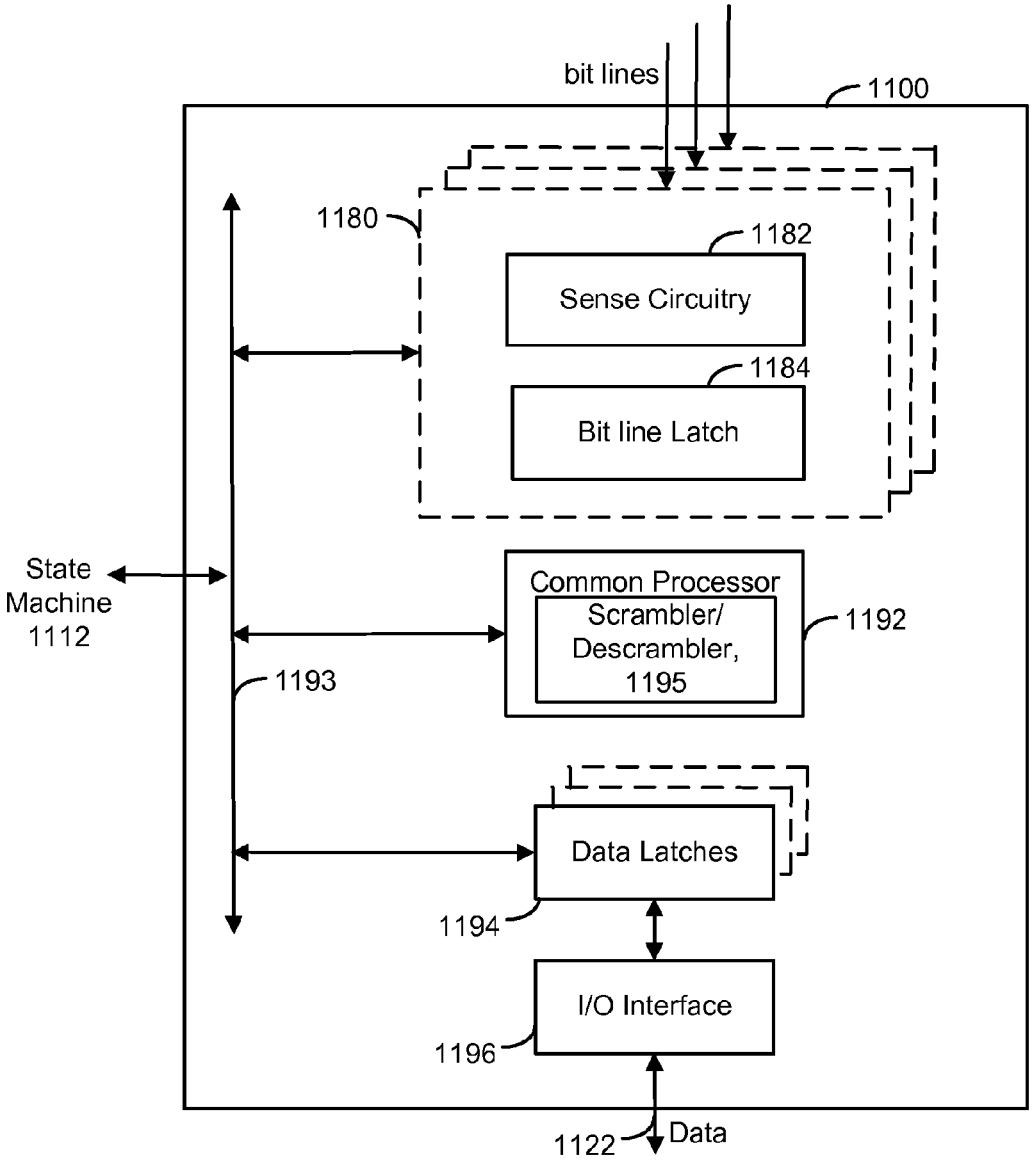
FIG. 13 is a block diagram depicting one embodiment of a read/write stack.

FIG. 13 is a block diagram depicting one embodiment of a read/write stack, also referred to as a sense block. As mentioned, a bank of partitioned R/W stacks may be provided to implement the read/write circuits 1165 of FIG. 12, in one possible approach. An example individual R/W stack 1100 includes a stack of sense modules 1180 for sensing k respective bit lines, a common processor 1192 to process data and coordinate transferring data, data latches 1194 for each respective bit line, and an I/O interface module 1196. Thus, in one possible embodiment, there will be a separate sense module 1180 for each bit line and one common processor 1192 for a set of sense modules 1180. The sense modules 1180, common processor 1192 and data latches 1194 may communicate via a data bus 1193. Further, the data latches 1194 may communicate with the I/O interface 1196 directly. A state machine 1112 (FIG. 12) may communicate with the bus 1193 optionally via a stack bus controller. For further details, refer to U.S. 2006/0140007 and U.S. 2008/0065813, both incorporated herein by reference.

Sense module 1180 comprises sense circuitry 1182, e.g., a sense amplifier, which determines whether a conduction current in a connected bit line is above or below a predetermined threshold level. Sense module 1180 also includes a bit line latch 1184 that is used to set a voltage condition on the connected bit line. For example, a predetermined state latched in bit line latch 1184 will result in the connected bit line being pulled to a state designating program inhibit (e.g., $V_{DD}$).

Common processor 1192 performs computations. For example, one of its functions is to determine the data stored in the sensed storage element and store the determined data in the set of data latches 1194. The set of data latches 1194 is used to store data bits determined by processor 1192 during a read operation. It is also used to store data bits imported from the data bus 1120 during a program operation. The imported data bits represent write data meant to be programmed into the memory. I/O interface 1196 provides an interface between data latches 1194 and the data bus 1120.

During read or sensing, the operation of the system is under the control of state machine 1112 that controls the supply of different control gate voltages to the addressed storage element. As it steps through the various predefined control gate voltages corresponding to the various memory states supported by the memory, the sense module 1180 may trip at one of these voltages and an output will be provided from sense module 1180 to processor 1192 via bus 1193. At that point, processor 1192 determines the resultant memory state by consideration of the tripping event(s) of the sense module and the information about the applied control gate voltage from the state machine via input lines 1193. It then computes a binary encoding for the memory state and stores the resultant data bits into data latches 1194. In another embodiment, bit line latch 1184 serves double duty, both as a latch for latching the output of the sense module 1180 and also as a bit line latch as described above.

Some implementations can include multiple processors 1192. In one embodiment, each processor 1192 will include an output line (not depicted) such that each of the output lines is wired-OR'd together. In some embodiments, the output lines are inverted prior to being connected to the wired-OR line. This configuration enables a quick determination during the program verification process of when the programming process has completed because the state machine receiving the wired-OR can determine when all bits being programmed have reached the desired level. For example, when each bit has reached its desired level, a logic zero for that bit will be sent to the wired-OR line (or a data one is inverted). When all bits output a data 0 (or a data one inverted), then the state machine knows to terminate the programming process. Because each processor communicates with eight sense modules, the state machine needs to read the wired-OR line eight times, or logic is added to processor 1192 to accumulate the results of the associated bit lines such that the state machine need only read the wired-OR line one time. Similarly, by choosing the logic levels correctly, the global state machine can detect when the first bit changes its state and change the algorithms accordingly.

During program or verify, the data to be programmed is stored in the set of data latches 1194 from the data bus 1120. The program operation, under the control of the state machine, comprises a series of programming voltage pulses applied to the control gates of the addressed storage elements. Each programming pulse is followed by a read back (verify) to determine if the storage element has been programmed to the desired memory state. Processor 1192 monitors the read back memory state relative to the desired memory state. When the two are in agreement, the processor 1192 sets the bit line latch 1184 so as to cause the bit line to be pulled to a state designating program inhibit. This inhibits the storage element coupled to the bit line from further programming even if programming pulses appear on its control gate. In other embodiments the processor initially loads the bit line latch 1184 and the sense circuitry sets it to an inhibit value during the verify process.

Data latch stack 1194 contains a stack of data latches corresponding to the sense modules. In one embodiment, there are three data latches per sense module 1180. In some implementations (but not required), the data latches are implemented as a shift register so that the parallel data stored therein is converted to serial data for data bus 1120, and vice versa. In the preferred embodiment, all the data latches corresponding to the read/write block of m storage elements can be linked together to form a block shift register so that a block of data can be input or output by serial transfer. In particular, the bank of r read/write modules is adapted so that each of its set of data latches will shift data in to or out of the data bus in sequence as if they are part of a shift register for the entire read/write block.

Additional information about the structure and/or operations of various embodiments of non-volatile storage devices can be found in U.S. Pat. No. 7,196,931, U.S. Pat. No. 7,023,736, U.S. Pat. No. 7,046,568, U.S. 2006/0221692, and U.S. 2006/0158947. All five of the immediately above-listed patent documents are incorporated herein by reference in their entirety.

The common processor 1192 may include a scrambler/descrambler 1195 which provides the functionality described in connection, e.g., with FIGS. 8a to 10b. The common processor 1192 can perform encoding and decoding such scrambling and descrambling, respectively. Generally, the common processor 1192 combines randomized or other non-user data with user data before the user data is written to the memory array, and combines the randomized or other non-user data with the user data when the user data is read back from the memory array.

For example, in a write mode, when user data which is to be written to a NAND string is received from the controller via the I/O interface 1196 and stored in the data latches 1194, the common processor 1192 may generate a key to scramble the data. For example, the common processor may generate a key based on a seed, a key shift process, an address of a page or other location in which the data is to be written, and a further offset associated with each specific common processor, as discussed. The address may be a block, word line, page and/or sub-page location, for instance. The scrambler/descrambler module 1195 uses the scrambling key to scramble the user data to provide modified or scrambled user data. In practice, the common processor may receive the user data in a processed form from the controller. Specifically, the controller may receive the user data from an external host and process the user data by adding overhead data such as ECC bits. The controller then provides the processed user data to the common processor, which performs scrambling to provide the final scrambled user data which is written in the storage elements. The common processor communicates with the sense modules 1180, including storing the scrambled user data in the bit line latch 1184, so that the scrambled user data is written to the storage elements.

As mentioned, a number of the R/W stacks may be provided, where each is responsible for storing a respective portion of user data to respective storage elements of a selected word line. The R/W stacks may operate generally in parallel.

During a read process, a host may provide a read command to the controller which specifies a location in the memory array to read data. The controller provides a corresponding command to one or more common processors which are associated with the specified location. The common processor obtains the user data, in scrambled form, from the sense module. For example, the scrambled user data may be stored in the bit line latch when it is read. The common processor 1192 regenerates the scrambling key it previously used in the write process. For example, the common processor may generate a key based on a seed, a key shift process, an address of a page or other location from which the data is read, and a further offset associated with each specific common processor, as discussed. The address may be a block, word line, page and/or sub-page location, for instance. The key shift process is used to shift the seed based on the address to arrive at the scrambling key which is also a descrambling key. The scrambler/descrambler module 1195 uses the descrambling key to descramble the read data to provide descrambled user data. The common processor then provides the descrambled data to the controller, such as via the data latches 1194 and I/O interface 1196. The off-chip controller may perform additional processing such as ECC decoding before making the data available to a host.

Figure 14:
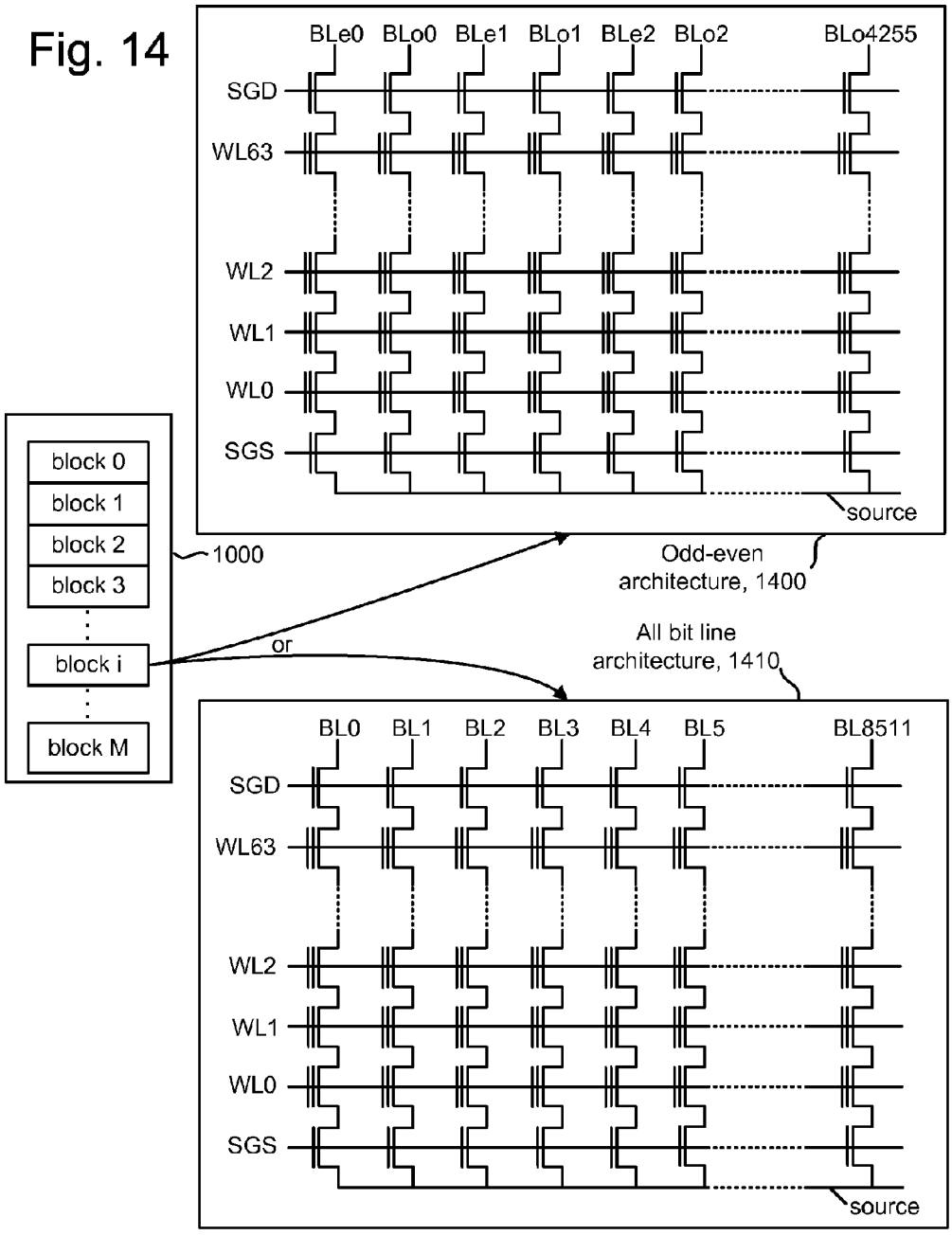
FIG. 14 depicts an example of an organization of a memory array into blocks for odd-even and all bit line memory architectures.

FIG. 14 illustrates an example of an organization of a memory array into blocks for an all bit line memory architecture or for an odd-even memory architecture. Exemplary structures of memory array 1400 are described. As one example, a NAND flash EEPROM is described that is partitioned into 1,024 blocks. The data stored in each block can be simultaneously erased. In one embodiment, the block is the minimum unit of storage elements that are simultaneously erased. In each block, in this example, there are 8,512 columns corresponding to bit lines BL0, BL1, . . . BL8511. In one embodiment referred to as an all bit line (ABL) architecture (architecture 1410), all the bit lines of a block can be simultaneously selected during read and program operations. Storage elements along a common word line and connected to any bit line can be programmed at the same time.

In the example provided, 64 storage elements are connected in series to form a NAND string. There are sixty four data word lines, where each NAND string includes sixty four data storage elements. In other embodiments, the NAND strings can have more or less than 64 data storage elements.

One terminal of the NAND string is connected to a corresponding bit line via a drain select gate (connected to select gate drain lines SGD), and another terminal is connected to c-source via a source select gate (connected to select gate source line SGS).

In one embodiment, referred to as an odd-even architecture (architecture 1400), the bit lines are divided into even bit lines (BLe) and odd bit lines (BLo). In this case, storage elements along a common word line and connected to the odd bit lines are programmed at one time, while storage elements along a common word line and connected to even bit lines are programmed at another time. Data can be programmed into different blocks and read from different blocks concurrently. In each block, in this example, there are 8,512 columns that are divided into even columns and odd columns.

During one configuration of read and programming operations, 4,256 storage elements are simultaneously selected. The storage elements selected have the same word line and the same kind of bit line (e.g., even or odd). Therefore, 532 bytes of data, which form a logical page, can be read or programmed simultaneously, and one block of the memory can store at least eight logical pages (four word lines, each with odd and even pages). For multi-state storage elements, when each storage element stores two bits of data, where each of these two bits are stored in a different page, one block stores sixteen logical pages. Other sized blocks and pages can also be used.

For either the ABL or the odd-even architecture, storage elements can be erased by raising the p-well to an erase voltage (e.g., 20 V) and grounding the word lines of a selected block. The source and bit lines are floating. Erasing can be performed on the entire memory array, separate blocks, or another unit of the storage elements which is a portion of the memory device. Electrons are transferred from the floating gates of the storage elements to the p-well region so that the $V_{TH}$ of the storage elements becomes negative.

Figure 15:
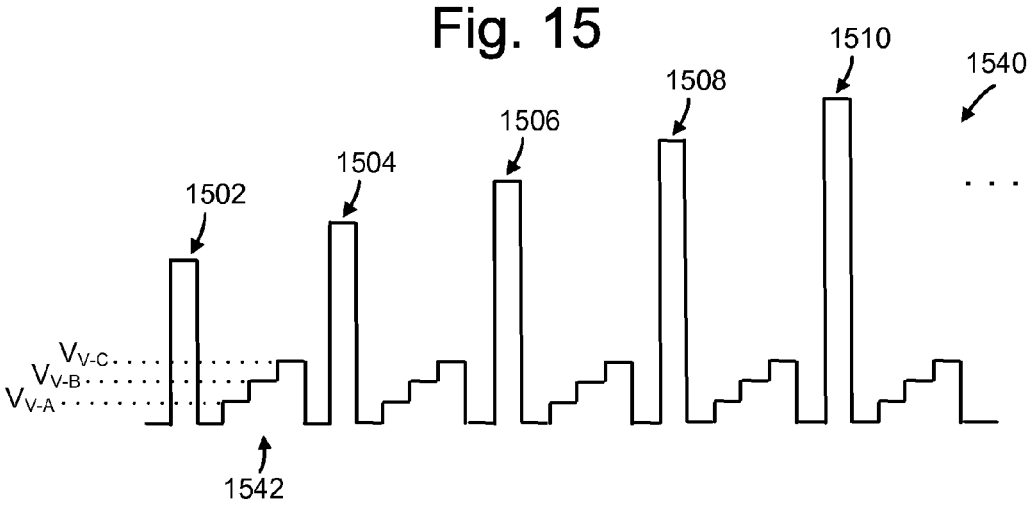
FIG. 15 depicts an example pulse train applied to the control gates of non-volatile storage elements during programming.

FIG. 15 depicts an example pulse train applied to the control gates of non-volatile storage elements during programming. The pulse train 1540 is used for programming and verifying storage elements. The pulse train 1540 includes a number of program pulses 1502, 1504, 1506, 1508, 1510 . . . and a set of verify pulses (one example of which is verify pulse set 1542) between each pair of program pulses for verifying the storage elements. In one embodiment, the programming pulses have a voltage, $V_{PGM}$, which starts at 12 V and increases by increments, e.g., 0.5 V, for each successive programming pulse until a maximum of, e.g., 20-25 V is reached. In some embodiments, there can be a verify pulse for each state that data is being programmed into, e.g., state A, B and C. In other embodiments, there can be more or fewer verify pulses. The verify pulses in each set can have amplitudes of $V_{V\text{-}A}$, $V_{V\text{-}B}$, and $V_{V\text{-}C}$, for instance.

Figure 16:
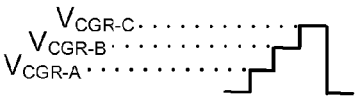
FIG. 16 depicts an example voltage waveform applied to the control gates of non-volatile storage elements during reading.

Similarly, during a read operation, as depicted in FIG. 16, the voltage on the selected word line is coupled to the control gates of selected storage elements, and a sequence of read voltages $V_{CGR\text{-}A}$, $V_{CGR\text{-}B}$ and $V_{CGR\text{-}C}$ is provided.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A non-volatile memory device, comprising:

a memory die;

a memory array of non-volatile storage elements in NAND strings fabricated on the memory die;

a plurality of bit lines in communication with the non-volatile storage elements;

sense blocks for the memory array, fabricated on the memory die, each sense block comprising a set of sense modules, each sense module in communication with a respective bit line of the plurality of bit lines, each sense block comprising a common processor in communication with each of the sense modules in the sense block; and circuitry fabricated on the memory die, the circuitry: (a) receives, from a controller which is not fabricated on the memory die, at least one write command and associated data, including user data, to be written to the non-volatile storage elements, (b) in response to the at least one write command, provides respective different portions of the associated data to the common processors, the common processors: (c) generate respective different keys for the respective different portions of the associated data, based on respective different addresses of respective different locations of the memory array, (d) encode the respective different portions of the associated data based on the respective different keys to provide respective different portions of modified data, and (e) provides the respective different portions of modified data to the sense modules to be written to the respective different locations of the memory array.

2. The non-volatile memory device of claim 1, wherein:

the associated data includes overhead data of the user data.

3. The non-volatile memory device of claim 1, wherein:

the respective different keys comprises random or pseudo random data, and the common processors encode the respective different portions by random or pseudo random scrambling of the associated data, including random or pseudo random scrambling of at least one of the respective different portions of the associated data using at least one of the respective different keys, the at least one of the respective different portions of the associated data and the at least one of the respective different keys each has a same bit length.

4. The non-volatile memory device of claim 1, wherein:

the common processors generate the respective different keys based on a key shift which uses at least one seed key and a respective offset associated with each common processor.

5. The non-volatile memory device of claim 1, wherein:

the respective different addresses are of respective different pages, word lines and/or blocks of the memory array.

6. The non-volatile memory device of claim 1, wherein:

the circuitry: (f) receives, from the controller, at least one read command regarding the associated data, to be read from the non-volatile storage elements, (g) in response to the at least one read command, provides respective read commands to the common processors, the common processors, in response to the respective read commands: (h) generate the respective different keys for the respective different portions of the associated data, (i) communicate with the sense modules to read the respective different portions of modified data, and (j) decode the respective different portions of modified data based on the respective different keys to provide respective different portions of decoded data.

7. The non-volatile memory device of claim 6, wherein:

the common processors provide the respective different portions of decoded data to the circuitry; and the circuitry provides the respective different portions of decoded data to the controller.

8. A non-volatile memory device, comprising:

a controller which is configured to communicate with circuitry which is fabricated on a memory die which includes a memory array of non-volatile storage elements, the controller is not fabricated on the memory die, the controller provides to the circuitry at least one write command and associated data, in response to which the circuitry provides respective different portions of the associated data to sense blocks for the memory array, fabricated on the memory die, the sense blocks generate respective different keys for respective different portions of the associated data, encode the respective different portions of the associated data based on the respective different keys to provide respective different portions of modified data, and store the respective different portions of modified data in respective different locations of the memory array.

9. The non-volatile memory device of claim 8, wherein:

the respective different keys are based on respective different addresses of the respective different locations of the memory array.

10. The non-volatile memory device of claim 8, wherein:

the respective different keys comprises random or pseudo random data.

11. The non-volatile memory device of claim 8, wherein:

each sense block comprises a scrambler and is associated with a plurality of the non-volatile storage elements, and the circuitry provides a write command and one of the respective different portions of the associated data to each scrambler.

12. The non-volatile memory device of claim 8, wherein:

the controller is configured to communicate with a host, and provides to the circuitry the at least one write command and associated data responsive to the host.

13. The non-volatile memory device of claim 8, wherein:

the controller performs error correction coding to provide the associated data.

14. The non-volatile memory device of claim 8, wherein:

the controller provides to the circuitry at least one read command, in response to which the circuitry causes the sense [modules] *blocks* to generate respective different keys for the respective different portions of the modified data, decode the respective different portions of the modified data based on the respective different keys to provide different portions of decoded data, and provide the respective different portions of decoded data to the circuitry.

15. A non-volatile memory device, comprising:

a memory die;

a memory array of non-volatile storage elements in NAND strings fabricated on the memory die;

a plurality of bit lines in communication with the non-volatile storage elements;

sense blocks for the memory array, fabricated on the memory die, each sense block comprising a set of sense modules, each sense module in communication with a respective bit line of the plurality of bit lines, each sense block comprising a common processor in communication with each of the sense modules in the sense block; and circuitry fabricated on the memory die;

the circuitry: (a) receives, from a controller which is not fabricated on the memory die, at least one read command regarding associated data to be read from the non-volatile storage elements, (b) in response to the at least one read command, provides respective read commands to the common processors, the common processors, in response to the respective read commands: (c) generate respective different keys for respective different portions of the associated data, the respective different keys are based on respective different addresses of respective different locations of the memory array, (d) communicate with the sense modules to read the respective different portions of the associated data, and (e) decode the respective different portions of the associated data based on the respective different keys to provide respective different portions of decoded data.

16. The non-volatile memory device of claim 15, wherein:

the associated data includes overhead data which is provided by the controller.

17. The non-volatile memory device of claim 15, wherein:

the respective different keys comprises random or pseudo random data, and the common processors decode the respective different portions of the associated data by random or pseudo random descrambling of the associated data, including random or pseudo random descrambling of at least one of the respective different portions of the associated data using at least one of the respective different keys, the at least one of the respective different portions of the associated data and the at least one of the respective different keys each has a same bit length.

18. The non-volatile memory device of claim 15, wherein:

the respective different addresses are of different pages, word lines and/or blocks of the memory array.

19. The non-volatile memory device of claim 15, wherein:

the common processors generate the respective different keys using a key shift which uses at least one seed key and the respective different addresses.

20. The non-volatile memory device of claim 15, wherein:

the common processors provide the respective different portions of decoded data to the circuitry; and the circuitry provides the respective different portions of decoded data to the controller.

*21. The non-volatile memory device of claim 1, wherein:*

*the non-volatile storage elements are arranged in a three-dimensional memory structure.*

*22. The non-volatile memory device of claim 8, wherein:*

*the non-volatile storage elements are arranged in a three-dimensional memory structure.*

*23. The non-volatile memory device of claim 15, wherein:*

*the non-volatile storage elements are arranged in a three-dimensional memory structure.*

* * * * *